US011526433B2

(12) United States Patent
Ravindar et al.

(10) Patent No.: US 11,526,433 B2
(45) Date of Patent: Dec. 13, 2022

(54) DATA STRUCTURE ALLOCATION INTO STORAGE CLASS MEMORY DURING COMPILATION

(71) Applicant: International Business Machines Corporation, Armonk, NY (US)

(72) Inventors: Archana Ravindar, Bangalore (IN); Saravanan Sethuraman, Bangalore (IN); Vaidyanathan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/816,504

(22) Filed: Mar. 12, 2020

(65) Prior Publication Data

US 2021/0286718 A1    Sep. 16, 2021

(51) Int. Cl.
   *G06F 12/02*    (2006.01)
   *G06F 8/35*    (2018.01)
   *G06F 8/41*    (2018.01)

(52) U.S. Cl.
   CPC ............ *G06F 12/0246* (2013.01); *G06F 8/35* (2013.01); *G06F 8/443* (2013.01); *G06F 8/447* (2013.01); *G06F 8/456* (2013.01)

(58) Field of Classification Search
   CPC ........ G06F 12/0246; G06F 8/35; G06F 8/443; G06F 8/447; G06F 8/456; G06F 8/436; G06F 8/4434; G06F 8/441
   See application file for complete search history.

(56) References Cited

U.S. PATENT DOCUMENTS

| 7,367,024 B2 | 4/2008 | Barua et al. |
| 7,421,715 B1 | 9/2008 | Margulis et al. |
| 8,499,293 B1* | 7/2013 | Ashcraft ................. G06F 8/441 717/154 |
| 9,104,436 B1 | 8/2015 | Michaud et al. |
| 9,715,453 B2 | 7/2017 | Kumar et al. |
| 10,593,380 B1* | 3/2020 | Volpe ...................... G06F 17/18 |
| 2006/0080372 A1* | 4/2006 | Barua ................... G06F 9/5016 |

(Continued)

FOREIGN PATENT DOCUMENTS

WO     2019076442 A1    4/2019

OTHER PUBLICATIONS

Volos et al., "Mnemosyne: Lightweight Persistent Memory," ASPLOS 2011, Proceedings of the 16th International Conference on Architectural Support for Programming Languages and Operating Systems, pp. 91-104.

*Primary Examiner* — Tasnima Matin
(74) *Attorney, Agent, or Firm* — Jorge R. Maranto

(57) ABSTRACT

A method, a computer program product, and a system for allocating a variable into storage class memory during compilation of a program. The method includes selecting a variable recorded in a symbol table during compilation and computing a variable size of the variable by analyzing attributes related to the variable. The method further includes computing additional attributes relating to the variable. The method also includes computing a control flow graph and analyzing the control flow graph and the additional attributes to determine an allocation location for the variable. The method further includes allocating the variable into a storage class memory based on the analysis performed.

18 Claims, 12 Drawing Sheets

(56) References Cited

U.S. PATENT DOCUMENTS

| | | | | |
|---|---|---|---|---|
| 2008/0235672 A1* | 9/2008 | Lozano | ................ | G06F 8/4442 |
| | | | | 717/140 |
| 2018/0113689 A1* | 4/2018 | Gschwind | ............... | G06F 8/443 |
| 2018/0341585 A1 | 11/2018 | Sreedhar et al. | | |

* cited by examiner

| INDEX > END THRESHOLD | WRITE COUNT > THRESHOLD | WRITE PATTERN PREDICTABLE | HIGH ILP | ALLOCATION |
|---|---|---|---|---|
| 0 | 0 | 0 | 0 | SCM |
| 0 | 0 | 0 | 1 | SCM |
| 0 | 0 | 1 | 0 | SCM |
| 0 | 0 | 1 | 1 | SCM |
| 0 | 1 | 0 | 0 | DRAM |
| 0 | 1 | 0 | 1 | SCM |
| 0 | 1 | 1 | 0 | SCM |
| 0 | 1 | 1 | 1 | SCM |
| 1 | 0 | 0 | 0 | DRAM |
| 1 | 0 | 0 | 1 | SCM |
| 1 | 0 | 1 | 0 | SCM |
| 1 | 0 | 1 | 1 | SCM |
| 1 | 1 | 0 | 0 | DRAM |
| 1 | 1 | 0 | 1 | SCM |
| 1 | 1 | 1 | 0 | DRAM |
| 1 | 1 | 1 | 1 | SCM |

FIG. 9

| INDEX > END THRESHOLD | READ COUNT > THRESHOLD | READ PATTERN PREDICTABLE | HIGH ILP | ALLOCATION |
|---|---|---|---|---|
| 0 | 0 | 0 | 0 | SCM |
| 0 | 0 | 0 | 1 | SCM |
| 0 | 0 | 1 | 0 | SCM |
| 0 | 0 | 1 | 1 | SCM |
| 0 | 1 | 0 | 0 | DRAM |
| 0 | 1 | 0 | 1 | SCM |
| 0 | 1 | 1 | 0 | SCM |
| 1 | 0 | 0 | 1 | SCM |
| 1 | 0 | 1 | 0 | DRAM |
| 1 | 0 | 1 | 1 | SCM |
| 1 | 1 | 0 | 0 | SCM |
| 1 | 1 | 0 | 1 | SCM |
| 1 | 1 | 1 | 0 | DRAM |
| 1 | 1 | 0 | 1 | SCM |
| 1 | 1 | 1 | 0 | DRAM |
| 1 | 1 | 1 | 1 | SCM |

FIG. 11

DATA STRUCTURE ALLOCATION INTO STORAGE CLASS MEMORY DURING COMPILATION

BACKGROUND

The present disclosure relates to data structure allocation, and more specifically, to allocating data structures into storage class memory within a system by performing a compiler analysis.

Compilers are translators that translate computer programs written in one language into another language. Primarily, compilers translate source code from a high-level programming language into a machine language to create an executable program. During compilation, data structures such as primitive data types, arrays, records, and objects are analyzed to determine particular attributes. These attributes include, but are not limited to, name, size, dimension, type, and a memory address for each data structure.

Storage class memory is flash-based memory that can be used as an intermediary between dynamic random-access memory (DRAM) and persistent storage within a system. Implementations of storage class memory can be used as either DRAM or as persistent storage to mitigate access-time gaps between memory and storage.

SUMMARY

Embodiments of the present disclosure include a computer-implemented method for allocating a data structure into storage class memory during the compilation of a program. The computer-implemented method includes selecting a variable recorded in a symbol table during compilation and computing a variable scope and a memory size required by the variable by analyzing attributes related to the variable. The computer-implemented method further includes computing additional attributes relating to the variable. The additional attributes include a write count indicating a total of writes made to the data structure for each procedure in which the variable is written to. The additional attributes also include a read count indicating a total of read operations to the variable for each procedure in which the data structure is read. The computer-implemented method also includes analyzing the scope, the memory size, and the additional attributes to determine an allocation location for the variable. The computer-implemented method further includes allocating the variable into a storage class memory based on the analysis performed.

Further embodiments are directed to a computer program product for allocating a variable into storage class memory during the compilation of a program, which can include a computer-readable storage medium having program instruction embodied therewith, the program instruction executable by a processor to cause the processor to perform a method. The method includes selecting a variable recorded in a symbol table during compilation and computing a variable scope and a memory size required by the variable by analyzing attributes related to the variable. The method further includes computing additional attributes relating to the variable. The additional attributes include a write count indicating a total of writes made to the data structure for each procedure in which the variable is written to. The additional attributes also include a read count indicating a total of read accesses to the variable for each procedure in which the data structure is read. The method also includes analyzing the scope, the memory size, and the additional attributes to determine an allocation location for the variable. The method further includes allocating the variable into a storage class memory based on the analysis performed.

Additional embodiments are directed to a variable allocation system for allocating a variable into storage class memory during the compilation of a program, including at least one processor and at least one memory component. The system also includes a compiler configured to translate the source code of a high-level programming language into a functionally equivalent low-level language that can be understood and executed by a computer. The system also includes a variable scope analyzer configured to determine whether variables are global or static, whether variables are local to a procedure, whether they escape a procedure, and the depth of the procedure in relation to the main procedure. The system also includes a variable size analyzer configured to determine the memory size of variables. The system further includes a variable read counter configured to determine the number of times variables are accessed and read within the program and a variable write counter configured to determine the number of times data structures are written to within the program. The system also includes an instruction-level parallelism analyzer configured to determine an instruction-level parallelism measurement for the program and a variable allocator configured to allocate variables to storage class memory-based, at least partially on, the variable size, variable scope, read count, and the write count of the variables.

BRIEF DESCRIPTION OF THE DRAWINGS

These and other features, aspects, and advantages of the embodiments of the disclosure will become better understood with regard to the following description, appended claims, and accompanying drawings where:

FIG. 9 is an exemplary write-based allocation table, in accordance with embodiments of the present disclosure.

FIG. 11 is an exemplary read-based allocation table, in accordance with embodiments of the present disclosure.

Figure 1:
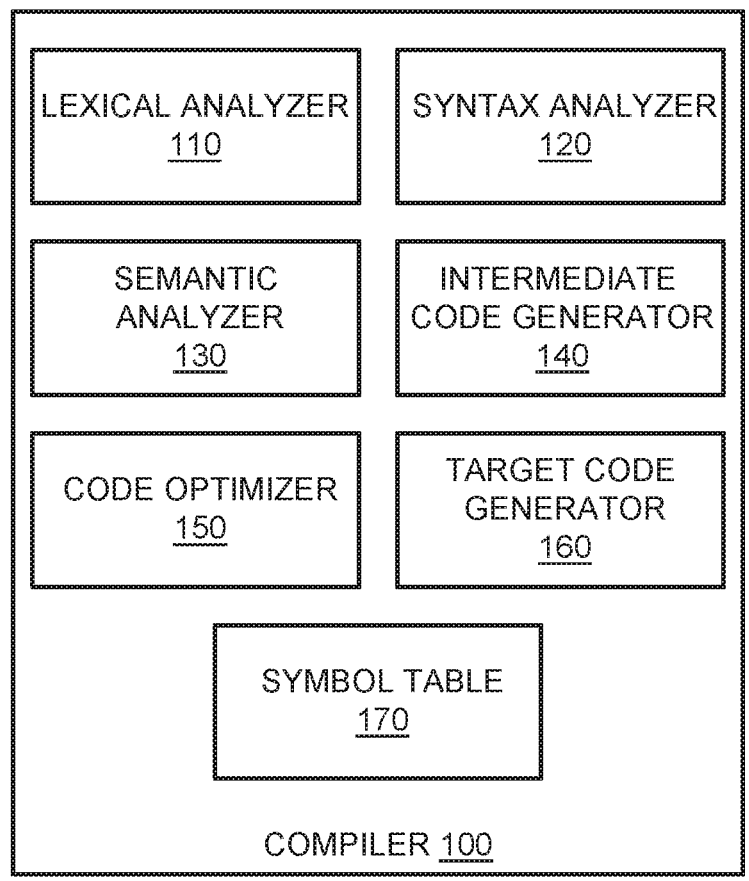
FIG. 1 is a block diagram illustrating an exemplary compiler, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to data structure allocation, and more specifically, to allocating variables into storage class memory within a system by analyzing the variables during compilation. While the present disclosure is not necessarily limited to such applications, various aspects of the disclosure may be appreciated through a discussion of various examples using this context.

A compiler translates programs written in one language into another language. Primarily, compilers translate program source code from a high-level programming language (e.g., JAVA, C #, Pascal, Python) to a lower level language (e.g., assembly language, machine code) to generate a program executable on a computing system. During compilation, if an error exists in the source code of the high-level language, the compiler can generate a report notifying a user of the error.

The source code of a programming language can include multiple data structures that can facilitate the operations of a program. A data structure is a specialized format for organizing, processing, retrieving, and storing data. A data structure can arrange data to suit a specific purpose so that it can be accessed and manipulated in various ways. The types of data structures include, but are not limited to, data types, abstract data types, linear data structures, trees, graphs, hash-based trees, and the like. Data types can include primitive data types (e.g., Booleans, characters, floating-point numbers, integers), non-primitive types (e.g., arrays, records, unions), abstract data types (e.g., containers, lists, queues, stacks). Linear data structures can include arrays (e.g., bit arrays, matrix, parallel array) and lists (e.g., linked list, skip list, double linked list).

During compilation, an assembler can assign memory locations or addresses to the data structures identified in the source code. The memory addresses correspond to addresses on the random-access memory (RAM) installed in a computing system. RAM is a volatile memory that can store data structures for a limited period, while power is supplied to the RAM. Typically, the type of RAM installed on a computing device is a dynamic random-access memory (DRAM). However, other types of RAM (e.g., SRAM, SDRAM, MRAM) can be also be installed on a computing system.

Storage class memory (SCM) is a type of flash-based memory with attributes of low latency and high bandwidth that closely resemble the memory requirements of RAM. Additionally, SCM contains non-volatile memory typically associated with storage-type technologies. SCM can be installed into a computing device and used as a means to bridge the gap in bandwidth and latency between memory and storage in computing systems. In systems that have SCM, the SCM can be configured as storage or as virtual memory (e.g., Virtual Flash Memory). Typically, data structures such as matrices, vectors, and graphs are allocated into SCM based on their size.

Limitations on efficiency remain, however, in utilizing SCM as virtual memory. For example, virtual memory techniques typically allocate data structures to an SCM during heavy workloads in an attempt to reduce latency. Most approaches utilize SCM for workloads with large write operations without analyzing the data structures being stored. Currently, there lacks a seamless way to allocate data structures across different types of memory based on the performance requirements of the data structures.

Embodiments of the present disclosure may overcome the above and other problems by using a variable allocation system. The variable allocation system is configured to allocate data structures suitable for storage in SCM. If the computing system does not utilize SCM, the compilation analysis system is further configured to allocate the data structures in RAM. Allocation of the data structures into SCM can be based upon various attributes of the data structures determined during compilation. These attributes include variable scope, variable size, read count, write count, and the amount of instruction-level parallelism (ILP) between successive reads or writes. To allocate data structures, the variable allocation system selects a variable recorded in a symbol table during compilation and computes the size occupied by the variable. Additional attributes relating to the data variable are also computed. The variable allocation system also generates a control flow graph. The intra-procedural and inter-procedural control flow graphs are analyzed. The additional attributes can also be analyzed to determine an allocation location for the variable. Based on the analysis, the variables can be allocated to SCM.

Embodiments of the present disclosure provide support for SCM within the middle layer of compilation, which increases the portability of the implementation. Currently, support for SCM exists in terms of persistent storage or linking libraries and use a specific API. These techniques leverage the persistence model when allocating data into SCM. Embodiments of the present disclosure allocate variables based on performance characteristics instead of simply looking for persistence keywords.

More specifically, the variable allocation system described herein computes various attributes of variables during the compilation of a program. The computed attributes identify which data structures can be stored in SCM with minimal or no degradation to computational performance. In other words, the variable allocation system optimally utilizes SCM within a computing system by selectively allocating variables that possess certain attributes. Accordingly, the space in RAM is freed and available for other data structures that require the lower latency and higher bandwidth provided by the RAM.

By way of example, source code for a program is being compiled. During compilation, several data structures of varying types are created and identified by the compiler. During the compilation process, the variable allocation system performs an analysis of each of the data structures to determine which data structures are suitable for placement into SCM. In this particular example, the program, or application, performs sparse matrix-vector multiplication. Typically, sparse matrix-vector multiplication takes the form of $y=Ax$ where $A$ is a sparse input matrix having sparse data, $x$ is a dense input vector, and $y$ is a dense output vector. In operations where $y=Ax$ is repeated with the same sparse input matrix $A$, $A$ can be preprocessed to reduce the parallel and sequential runtime of those operations. Utilizing the variable allocation system, variable data structures, such as the sparse input matrix, can be placed in SCM with little to no computational performance loss.

In some embodiments, the variable allocation system determines the scope of the variables declared in the source code being compiled. The scope of the variables can be global, static, or local. If the variables are of global or static scope, then they can be allocated into SCM. However, if the variables are local, then an escape analysis can be performed on the local variables to determine whether they are referenced beyond their originating procedure. If a local variable escape beyond the main procedure of the source code, then it can be allocated into SCM.

In some embodiments, the additional attributes computed for the data structures include a write count made to the particular data structure for each procedure within the program in which the data structure is written to. For example, a subroutine within the program may write to the data structure four times, which would then be recorded. The write count can reflect the number of times in which it is written. For instance, four as reflected in the example above. In some embodiments, the write count is stored as a two-dimensional array storing the procedures and write counts performed in the corresponding procedure in each row of the array.

In some embodiments, the variable allocation system determines a memory size of the variables declared in the source code being compiled. An average memory size of the variables can be computed and compared against the memory sizes of the variables. Upon comparing the variables, if a variable is of greater memory size than the average memory size, then it can be allocated into SCM. In some embodiments, the average memory size is a predetermined value set by an administrator. In some other embodiments, the average memory size is a defined function set by an administrator.

In some embodiments, analyzing the additional attributes includes comparing a write count to a first write threshold. The first write threshold can be a predetermined threshold set by an administrator. If a determination is made that the write count is greater than the first write threshold, a procedure count can be calculated. The procedure count can reflect a number of procedures in which the write count exceeds the first write threshold. A comparison can then be made to the procedure count and a second write threshold. The second write threshold can be a predetermined threshold set by an administrator. A determination can be made as to whether or not the procedure count is greater than the second write threshold. If it is greater, then the variable is written into by a large number of routines (determined by the second write threshold). Since the write penalty for SCM is substantial in comparison to a write penalty for DRAM, the overhead of write operations to SCM can overshadow the benefit caused due to, at least in part, the increased availability of space in DRAM.

In some embodiments, the additional attributes computed for the variable include a read count indicating a total of read operations made to the particular data structure for each procedure within the program in which the variable is read. For example, a subroutine within the program may access the variable to read the stored information of the variable three times. The read count can reflect the number of times in which it is read. For instance, three as reflected in the example above. In some embodiments, the read count is stored as a two-dimensional array storing the procedures and read counts performed in the corresponding procedure in each row of the array.

Referring now to the figures, FIG. 1 is a block diagram illustrating a compiler 100 for compiling computer source code, in accordance with embodiments of the present disclosure. The compiler 100 includes a lexical analyzer 110, a syntax analyzer 120, a semantic analyzer 130, an intermediate code generator 140, a code optimizer 150, a target code generator 160, and a symbol table 170.

The lexical analyzer 110 is a component of the compiler 100 configured to translate characters in source code into a sequence of tokens, in accordance with embodiments of the present disclosure. The lexical analyzer 110 identifies tokens within the source code by matching sequential characters to known patterns. A token, as referred herein, is a string with a logical meaning. Each token can include a token name and a token value, where the token name defines a category of the lexical unit for the token. Token names include, but are not limited to, identifier, keyword, separator, operator, literal, and comment. For instance, identifiers can be variables or data structures within the source code. If a token is given a token name of identifier or procedure, the lexical analyzer 110 can store that token in the symbol table 170 for future reference. The lexical analyzer 110 is further configured to transmit tokens to the syntax analyzer 120 once tokenization of a character or sequence of characters has occurred.

The lexical analyzer 110 is further configured to filter comment lines and white space characters within inputted source code. For example, white space characters such as a tab, space, newline characters, and comment lines are not needed to translate the source code. Any white space or comment line can be stripped from the code and discarded. The discarded information does not produce tokens. In some embodiments, the lexical analyzer 110 factors in the structure of the inputted source code to determine whether the white space or comment lines are significant. For example, some languages delimit blocks of code with indentions. These indentions signify block structure and can be tokenized.

The lexical analyzer 110 is further configured to assist other components in error recovery. The lexical analyzer can associate line numbers with generated error messages, which can assist developers in determining where the error occurred in the source code. Additionally, the lexical analyzer 110 can detect various errors in the source. These errors include, but are not limited to, numeric literals that are too long, long identifiers, improper numeric literals, and input characters that are not in the source code.

The syntax analyzer 120 is a component of the compiler 100 configured to transform a string of tokens into a parse tree, in accordance with embodiments of the present disclosure. The syntax analyzer 120 further verifies the syntax of a string of tokens to determine whether the string is grammatically in compliance with the context-free grammar of the inputted programming language. A context-free grammar is a set of rules that define the syntax of a programming language. The syntax analyzer 120 can analyze the string of tokens while generating the parse tree to determine whether the string is in compliance with the rules defined by the context-free grammar.

The syntax analyzer 120 is further configured to parse the sequence of tokens into a parse tree by performing top-down parsing or bottom-up parsing. In top-down parsing, parsing construction of the parse tree starts at the root and then proceeds toward the leaves. Various techniques for top-down parsing can be performed. These techniques include, but are not limited to, predictive parsing and recursive descent parsing. In predictive parsing, the syntax analyzer 120 predicts which products should be used to replace a specific input string. To do so, the syntax analyzer 120 uses a look-ahead point, which points toward the next input symbols. Thus, backtracking does not need to occur to generate the parse tree. In recursive descent parsing, the syntax analyzer 120 recursively parses the sequence of token to make a parse tree.

In bottom-up parsing, parsing construction of the parse tree starts with a leaf and proceeds toward its root. Bottom-up parsing techniques include, but are not limited to, shift-reduce parser, operator precedence parser, and LR parser. A shift-reduce parser scans and parses a string of tokens in a forward pass. A parse tree is built incrementally, bottom-up, and left to right, without backtracking. Subtrees are made for each pass of the string of tokens until they are joined, and the parse tree is completed.

The syntax analyzer 120 is further configured to provide error handling while generating a parse tree. When the syntax analyzer detects an error, such as a missing operator/operand in an expression, several error-recovery strategies can be implemented. These error-recovery strategies include, but are not limited to, panic mode error recovery, phrase level error recovery, error production, and global correction.

The semantic analyzer 130 is a component of the compiler 100 configured to check the semantics of a program and determine whether the language constructs are meaningful or not, in accordance with embodiments of the present disclosure. The semantics analyzer 130 is further configured to perform various checks, such as uniqueness checks, the flow of control checks, type checks, and name-related checks, in order to detect semantic-type errors. When performing type checks, the semantic analyzer 130 reports an error if an operator is applied to incompatible operands. For example, applying binary addition to an array and a function is incompatible, which would result in an error. Additionally, type checks can include checking expressions, statements, and functions.

The intermediate code generator 140 is a component of the compiler 100 configured to take a hierarchical representation of parsed source code and prepare a linear representation of that code, in accordance with embodiments of the present disclosure. Intermediate code can be generated by analyzing syntax-directed translation rules with the generated parse trees. The analysis can modify the source code into an intermediate form that is made to be source language independent. Typically, the intermediate code generator 140 generates the intermediate code after the semantic analysis is performed by the semantic analyzer 130.

The intermediate code generator 140 is further configured to represent generated intermediate code as syntax trees, directed acyclic graphs, postfix notation, and as three address code. A syntax tree can be a graphical representation of the source code being compiled where a node represents an operator, and children of the node represent operands. To generate the target code or desired code, the syntax tree can be traversed in a post-order form. A directed acyclic graph generates a tree similar to that of a syntax tree that avoids replicating similar nodes. Prior to a node being created, a check is made to determine if there exists a similar node. If a similar node is found, a pointer directed to the found node is returned instead of creating a new node. Postfix notation is a linear representation of a syntax tree. The postfix notation can be written by traversing the syntax tree in a post-order form. In postfix notation, the operators can be placed after the operands. Three address code, similar to postfix notation, is a linear representation of a syntax tree or a directed acyclic graph where exact names correspond to interior nodes of a graph. For example, three address code is a sequence of statements of the form A=B OP C where A, B, and C are variables, constants, or temporary variables generated by the compiler. OP can be any arithmetic operation or logical operation applied to the operands B and C.

The code optimizer 150 is a component of the compiler 100 configured to improve the time and space required for the target code being generated, in accordance with embodiments of the present disclosure. The code optimizer 150 can apply optimization techniques to reduce the code size of source code compiled in an intermediate. These optimization techniques include, but are not limited to, sub-expression elimination, copy propagation, dead code elimination, constant propagation, loop optimization, loop invariant computation, and elimination of induction variables. The code optimizer 150 is further configured to perform a control flow analysis and a data flow analysis to determine which optimization technique to employ. Control flow analysis determines the control structure of a program and builds a control flow graph. A data flow analysis determines the flow of scalar values and builds data flow graphs.

The target code generator 160 is a component of the compiler 100 configured to generate target code by applying code generation algorithms to source code in an intermediate form, in accordance with embodiments of the present disclosure. The intermediate code received by the target code generator 160 can be in a linear form or a hierarchical form. Linear form representations of intermediate code include postfix notation and three address code. Hierarchical representations include syntax trees and directed acyclic graphs.

The target code generator 160 is further configured to map the names of variables in the source code to address of data objects in the runtime memory. For example, the name in a three-address statement can refer to an entry in the symbol table 170. Each label in the three-address code can be converted to actual memory addresses.

The symbol table 170 is a data structure of the compiler 100 configured to store information about the variables and procedures in a program being compiled. The symbol table 170 is typically created during the lexical analysis performed by lexical analyzer 110 and used by the various components of the compiler 100 during compilation of a program. During lexical analysis, every time a new identifier is introduced from the source code, the lexical analyzer 110 checks the symbol table 170 to determine if the identifier has been already stored. If the identifier has not been stored, a new entry is created in the symbol table 170 for that identifier.

The symbol table 170 is further configured to store additional attributes for each stored entry. These attributes include, but are not limited to, name, size, dimension, type, line of declaration, line of usage, and memory address. Additionally, entries can be organized based on the data structure used to create the symbol table 170. The ways the symbol table 170 can be stored and organized include, but are not limited to, linear lists, ordered arrays, unordered arrays, ordered linked lists, unordered linked lists, binary search trees, height-balanced trees, and hash tables.

The symbol table 170 is further configured to allow operations to be performed on the symbol table 170. The types of operations that can be performed on the symbol table 170 can depend on whether the source code language is block-structured (e.g., C, C++, Java) or non-block structured (e.g., Fortran, COBOL, BASIC). For non-block structured languages, the operations consisting of insert and lookup can be performed on the symbol table 170. For block-structured languages, the operations insert, lookup, set, and reset can be performed on the symbol table 170.

It is noted that FIG. 1 is intended to depict the major representative components of an exemplary compiler 100. In some embodiments, however, individual components may have greater or lesser complexity than as represented in FIG. 1, components other than or in addition to those shown in FIG. 1 may be present, and the number, type, and configuration of such components may vary.

Figure 2:
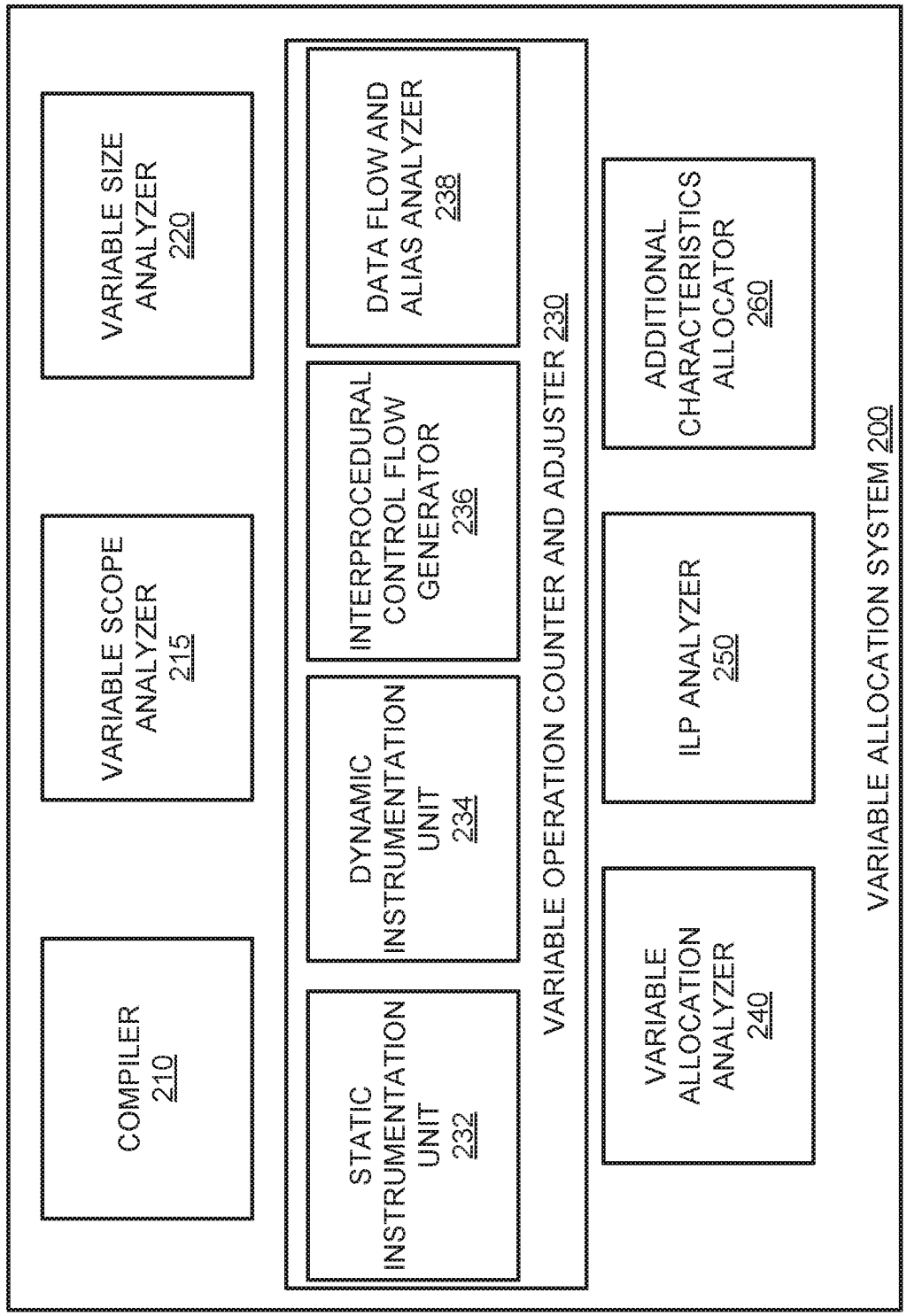
FIG. 2 is a block diagram illustrating a variable allocation system, in accordance with embodiments of the present disclosure.

FIG. 2 is a block diagram illustrating a variable allocation system 200 for allocating variables into storage-class memory based on attributes relating to the variables, in accordance with embodiments of the present disclosure. The variable allocation system 200 includes a compiler 210 (e.g., which may be the same as, or substantially similar to, compiler 100 of FIG. 1), a variable scope analyzer 215, a variable size analyzer 220, a variable operation counter and adjuster 230, a variable allocation analyzer 240, an instruction-level parallelism analyzer 250, and an additional characteristics allocator 270. The variable operation counter and adjuster 230 includes a static instrumentation unit 232, a dynamic instrumentation unit 234, an inter-procedural control flow generator 236, and an inter-procedural data-flow and alias analyzer 238.

The compiler 210 is a component of the variable allocation system 200 configured to translate the source code of a high-level language into a functionally equivalent low-level language that can be understood and executed by a computer. For example, the compiler 210 can translate the source code of a program written in Java into machine code to allow the program to be executed on a computer. In some embodiments, the compiler 210 operates as an interpreter. An interpreter reads source code line by line, written in a high-level programming language, also reads data pertaining to the lines read. The lines being read are then run or executed directly against the data to produce a result. In some embodiments, compiler 210 operates as both a compiler and an interpreter. For example, in some high-level languages, such as Java, programs are compiled to produce a byte code. The byte code is then interpreted during execution. In another example, the compiler 210 may generate a syntax tree which can then be interpreted directly.

The variable scope analyzer 215 is a component of the variable allocation system 200 configured to determine the scope of variables. The variable scope analyzer 215 can determine if a variable is global, static, or local. Based on that determination, the variable can be a candidate for SCM allocation. The variable scope analyzer 215 is further configured to perform an escape analysis that tracks variables that escape a procedure in which they are defined in. If a variable escapes to a procedure that live long enough, then the variable can be considered as a candidate SCM allocation. One way to compute the life of a variable is to evaluate the depth of the procedure in a call tree in relation to the main procedure as well as evaluating the depth of the procedure in relation to the leaf procedure in the call tree. A variable is considered live at some point if it holds a value that may be needed in the future, or equivalently, if its value may be read before the next time the variable is written to.

The variable size analyzer 220 is a component of the variable allocation system 200 configured to determine the memory size of variables, in accordance with embodiments of the present disclosure. The memory size, or variable size, of a variable or data structure refers to the amount of memory required to store the variable. Variable sizes differ depending on the type of the variable being stored as well as the language the source code is written in. For example, in C++, a Boolean has a minimum variable size of one byte, and a long integer has a minimum variable size of four bytes. While primitive data types may have set variable lengths, other data structures can vary in variable size.

In some embodiments, the variable size analyzer 220 computes variable memory sizes using semantic actions during a semantic analysis phase of compilation. Synthesized variable attributes and inherited variable attributes can be used to compute the variable size of a variable. Synthesized attributes, as referred herein, refer to parent attributes computed using the attributes of the parent's children. The variable size analyzer 220 is configured to utilize the information gathered during the semantic analysis phase to determine the variable size. During semantic analysis, a type check can be performed to determine the data structure of a variable. Types can be represented as type expressions. Type expressions can be used to represent the type of programming language construct. Type expressions can be a basic type (e.g., Boolean, char, integer, real) or a complex type (e.g., array).

The variable operation counter and adjuster 230 is a component of the variable allocation system 200 configured to count the number of read operations and write operations performed on data structures, in accordance with embodiments of the present disclosure. The variable operation counter and adjuster 230 can assign each variable two counter arrays. The first array can be used for the number of read operations, and the second array can be used for the number of write operations performed on the variable. The variable operation counter and adjuster 230 is also configured to traverse all procedures within source code to determine a read and write count within each procedure for each variable within the source code.

The variable operation counter and adjuster 230 can traverse each procedure to analyze the read operations and write operations of a variable. A variable's read count array can be incremented when a read operation is encountered within a procedure. Similarly, a variable's write count can be incremented when a write operation is encountered within a procedure. Counting the read operations and the write operations can be performed using the static instrumentation unit 232 and the dynamic instrumentation unit 234.

The static instrumentation unit 232 is a component of the variable operation counter and adjuster 230 configured to add semantic actions in variable declarations and access operations occurring in loops whose loop bounds can be determined statically. By adding the semantic actions, the variable operation counter and adjuster 230 can determine the read count and write count for variables that operate within a loop. It can also determine the loop stride if the variable is statically deterministic. The stride defines the read or write pattern depending on the operation which can indicate a cache friendliness.

The dynamic instrumentation unit 234 is a component of the variable operation counter and adjuster 230 configured to add dynamic instrumentation at read and write operation locations. The dynamic instrumentation unit 235 can be used by the variable operation counter and adjuster 230 for loops whose bounds cannot be determined statically. In some embodiments, the source code being analyzed can be processed using semantic actions to generate a program with instrumentation added, and when run with representative inputs, the read and write counts are computed. In some embodiments, the source code being analyzed can be completed into a program and run with representative inputs, and the counts are computed accordingly. The dynamic instrumentation unit 234 can compute the read and write counts of variables within a dynamic loop. Additionally, the dynamic instrumentation unit 235 can compute read and write patterns. The read and write patterns can be used to determine the cache friendliness of the read and write operations. In some embodiments, the variable operation counter and adjuster 230 traverses the source code using a depth-first search (DFS) order during the semantic analysis phase performed by the compiler 210.

The inter-procedural control flow graph generator 236 is a component of the variable allocation system 200 configured to construct a control flow graph from source code, in accordance with embodiments of the present disclosure. A control flow graph is a representation, using graph notation, of all paths that may be traversed through a program during execution. A control flow graph consists of several nodes, each representing a basic block. A basic block is a straight-line code sequence with no branches except to the entry and no branches out except to the exit. The compiler 210 can deconstruct the source code of a program into its basic blocks prior to the semantic analysis phase. Typically, an entry block, through which control enters into the flow graph, and an exit block, through which all control flow leaves, are considered specially designated blocks.

The inter-procedural control flow graph generator 236 can construct the control flow graph by starting from a full flow graph of source code and contracting every edge whose source has a single exit and whose destination has a single entry. While a control flow graph can be used to represent the flow of source code, other graphs can be used. These graphs include, but are not limited to, a call graph, an abstract syntax tree, a program dependence graph, and the like. Each control flow graph of a procedure can be connected together via a caller-callee relationship. The connected control flow graphs form the inter-procedural control flow graph rooted at the main procedure. The main procedure being the first procedure executed upon program instantiation.

The inter-procedural data-flow and alias analyzer 238 is a component of the variable operation counter and adjuster 230 configured to perform an interprocedural data-flow analysis and an alias analysis, in accordance with embodiments of the present disclosure. Interprocedural data-flow analysis and alias analysis track variables passed among procedures as parameters and through global or static pointers. These analyses can be used to adjust read and write counts of variables if they are accessed in multiple procedures under different names through parameters or pointers.

The variable allocation analyzer 240 is a component of the variable allocation system 200 configured to allocate variables based on characteristics of the variables. These characteristics include, but are not limited to, write counts, a number of writes to a variable, a number of procedures in which the variable is written, write patterns of the variables, and instruction-level parallelism between the writes. The variable allocation analyzer 240 can use these characteristics and perform an analysis to determine whether a variable should go to SCM or DRAM. The analysis can consist of an analysis based on write counts and an analysis based on read counts.

During compilation, variables are typically allocated directly into DRAM. However, if the variables have been marked for allocation to SCM, the variable allocation analyzer 240 can allocate the data structure into SCM of a system. The variable allocation analyzer 240 is further configured to detect an SCM within a system. If the variable allocation analyzer 240 determines that no SCM exists within a system, then all variables are placed into DRAM regardless of any mark indicator.

The ILP analyzer 250 is a component of the variable allocation system 200 configured to determine the ILP of source code, in accordance with embodiments of the present disclosure. ILP is a measure of how many instructions in the source code can be executed simultaneously. ILP allows the compiler 210 and a processor to overlap the execution of multiple instructions or to change the order in which instructions are executed.

The ILP analyzer 250 is further configured to perform an ILP measurement between basic blocks containing a variable. In some embodiments, the ILP analyzer 250 analyzes the number of basic blocks between a first basic block containing a variable and a second basic block containing the variable. If the number of basic blocks between the first basic block and the second basic block is greater than or equal to a block threshold, then the variable can be considered as having a sufficient amount of ILP. The block threshold can be a predetermined threshold which can be changed or adjusted by an administrator to allow for optimization of the ILP measurement determination.

The additional characteristics allocator 260 is a component of the variable allocation system 200 configured to allocate variables into SCM based on additional characteristics provided to the variables. In some embodiments, the additional characteristics allocator 260 allocates variables based on special operating system API calls. Special operating system API calls can mark variables for allocation into SCM that override some, or all attributes computed for a variable. For example, a variable may have been marked for allocation into DRAM, but it is called using a special operating system API call that overrides the DRAM allocation and allocates it into SCM.

In some embodiments, a user-specified directive is put within the source code that requests the compiler 210 to allocate certain variable types into SCM. For example, a directive can be put into place that all arrays are to be placed into SCM regardless of their attributes. The additional characteristics allocator 260 can traverse the source code to locate directives providing allocation instructions.

In some embodiments, the additional characteristics allocator 260 allocates variables based on a code pattern match. Each procedure can be analyzed to determine if the code pattern matches a predetermined pattern. The predetermined pattern can indicate a source of boot code, or some other secure code, that requires the need to be saved in persistent memory. Upon detection, the variables and code detected within that pattern can be allocated into SCM.

In some embodiments, the ILP analyzer 250 identifies the basic blocks that contain a loop between a first basic block containing a variable and a second basic block containing the variable. The ILP analyzer 250 can determine if the loop accesses the variable, whether the loop has any dependencies among the iterations, and whether the loop can be performed in parallel. If the loop does not access the variable, has no dependencies, and can be performed in parallel, then the variable can be considered as having a sufficient amount of ILP. Once determined, the ILP analyzer 250 can mark variables found to have a sufficient amount of ILP for allocation into SCM.

In some embodiments, the ILP analyzer 250 identifies inter-iteration dependency in basic blocks. Inter-iteration dependency refers to situations where dependence exists between two instructions of the same iteration. The ILP analyzer 250 can identify the basic blocks that a have loop between a first basic block containing a variable and a second basic block containing the variable. If the loop does not access the data structure but contains inter-iteration dependencies, the variable can still be considered as having a sufficient amount of ILP. If the inter-iteration dependencies can be transformed into a loop that removes the loop carried dependency, then the variable can be considered as having a sufficient amount of ILP.

It is noted that FIG. 2 is intended to depict the major representative components of an exemplary precision cohort analytics system 200. In some embodiments, however, individual components may have greater or lesser complexity than as represented in FIG. 2, components other than or in addition to those shown in FIG. 2 may be present, and the number, type, and configuration of such components may vary.

Figure 3:
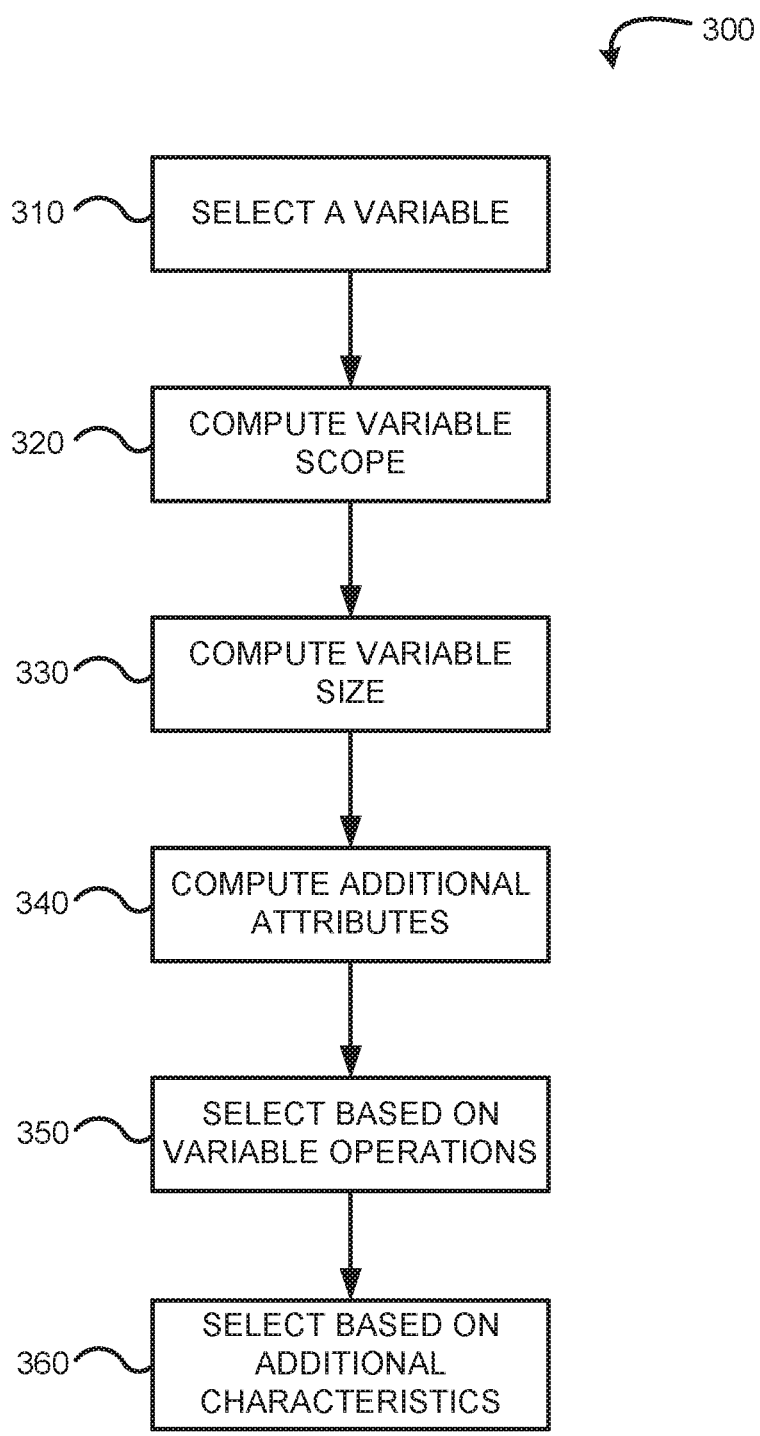
FIG. 3 is a flow chart of a data structure allocation to storage class memory analysis process, in accordance with embodiments of the present disclosure.

FIG. 3 is a flow diagram illustrating a process 300 for allocating a data structure into SCM, in accordance with embodiments of the present disclosure. The process 300 may be performed by hardware, firmware, software executing on at least one processor, or any combination thereof. For example, any or all of the steps of the process 300 may be performed by one or more computing devices (e.g., computer system 1200 of FIG. 12).

The process 300 begins by selecting a variable from a symbol table generated by a compiler 210 during the compilation of source code. This is illustrated in step 310. The variable selected is for analysis as to whether to allocate the variable into SCM instead of DRAM during the execution of a program created by the source code. In some embodiments, the symbol table is updated with variables, or other variables, during the lexical analysis of compilation.

Once selected, the variable scope analyzer 215 computes the scope of the variable using semantic actions that track the location of the variable definition. This is illustrated at step 320. The scope of the variable can be static, global, or local. If the variable scope analyzer 215 detects that the variable is accompanied by static keywords, it can be considered a static variable. If the variable scope analyzer 215 detects that the variable is declared outside the scope of any function, it can be considered a global variable. If the variable scope analyzer 215 detects that the variable is declared within a function, it can be considered a local variable. Global and static variables are initially marked for SCM allocation, while local variables remain unmarked. The variable scope analyzer 215 also selects local variables within a function that escapes the function. Escaped variables can be further analyzed to determine whether they should be marked for SCM allocation or DRAM allocation. The escape analysis is discussed in greater detail in process 400 of FIG. 4.

The variable size analyzer 220 computes the total memory size occupied by the variable. This is illustrated in step 330. Using semantic actions after a syntax analysis phase performed by the compiler 210, attributes can be defined to compute the variable memory size of the variable generated by the source code. These attributes include, but are not limited to, synthesized attributes and inherited attributes. Synthesized attributes relate to parental attributes of the variable using children attributes produced by the variable. The attributes are defined based on the type of the variable and its composite nature, such as array dimensions and structure fields, as described below. If variables are declared as pointers and allocated dynamically using a memory allocation command (e.g., malloc( )) can also be tracked using semantic actions embedded in program statements as described below. Memory sizes of a variable can be computed statically if the variable contains a composite component (e.g., arrays, structures, unions). For data types such as linked lists, memory size grows dynamically during program execution and cannot be tracked statically.

By way of example, the variable size analyzer 220 determines the size of a complex variable of a two-dimensional array holding integers. The first-dimension size of the array takes one thousand bytes, and the second-dimension size takes two thousand bytes. The memory size of the array can be computed by multiplying the integer byte size by the first-dimension size and the second-dimension size. If the variable is a dynamic size (e.g., linked lists), then the memory size can be allocated at runtime using a memory allocation command. Once allocated, the variable can be analyzed at runtime to determine the memory size or a heuristic value can be used.

Variables with memory size greater than the average memory size of all the variables that feature in the candidate list after a variable scope analysis can be marked for allocation into SCM. The other variables can be marked for allocation into DRAM.

Additional attributes relating to the variable are computed by the variable operation counter and adjuster 230. This is illustrated in step 340. The additional attributes include a read count and a write count for each procedure in which a read operation or write operation occurs on the variable. The read count can be incremented each time a read operation occurs on the variable, and the write count can be incremented each time a write operation occurs to the variable. In instances where a read and write operation occur to the variable, both the read count and the write count can be incremented.

In instances where a read operation and/or write operation occur within a statement that is a loop, additional compilation algorithms can be implemented to determine the loop bounds and hence the counts. In some embodiments, the variable operation counter and adjuster 230 implements a compilation algorithm when a loop occurs to traverse back branches and compute dominator nodes utilized. If the loop iteration count is static, then the read count and/or the write count is incremented by the loop iteration count. However, if the loop iteration count is dynamic, then a standard heuristic value can be used to increment the read count and/or the write count. Alternatively, the program can be instrumented to place read and write counters using semantic actions, and when executed with a representative input, can give the read and write counts. In addition to read, write counts, the read and write pattern can be captured in a file. Once the counts are computed, they can be adjusted for scenarios when variables are passed as procedure parameters, return variables, and pointers. In these scenarios, the individual and overall inter-procedural control flow graphs, generated by the inter-procedural control flow generator 236 using the source code being compiled by the compiler 210, can be used.

In some embodiments, the control flow graph is generated during the intermediate code generation phase of the source code being compiled. The control flow graph can be used to traverse the source code to determine additional attributes relating to the variable. Additionally, the control flow graph will be used later to determine an ILP measurement relating to the variable.

The scope, the memory size, and the additional attributes are analyzed by the variable allocator 260 to determine an allocation location for the variables. This is illustrated in step 350. Several characteristics of the variables can be used to determine whether a variable is to be allocated to SCM.

These characteristics can be used in conjunction or separately when making a determination. These characteristics include, but are not limited to, scope, variable memory size being greater than the average variable memory size, the variable operation counts being greater than a predetermined count threshold, a procedure count being greater than a procedure threshold, and the measurement of ILP between the variable operations. Based on the characteristics of the variable, it can be placed into DRAM or SCM.

Variables are allocated based on the mark indicator given during process 300. This is illustrated in step 360. For example, variables marked for allocation into SCM are allocated into SCM. Variables marked for allocation into DRAM are allocated into DRAM.

Figure 4:
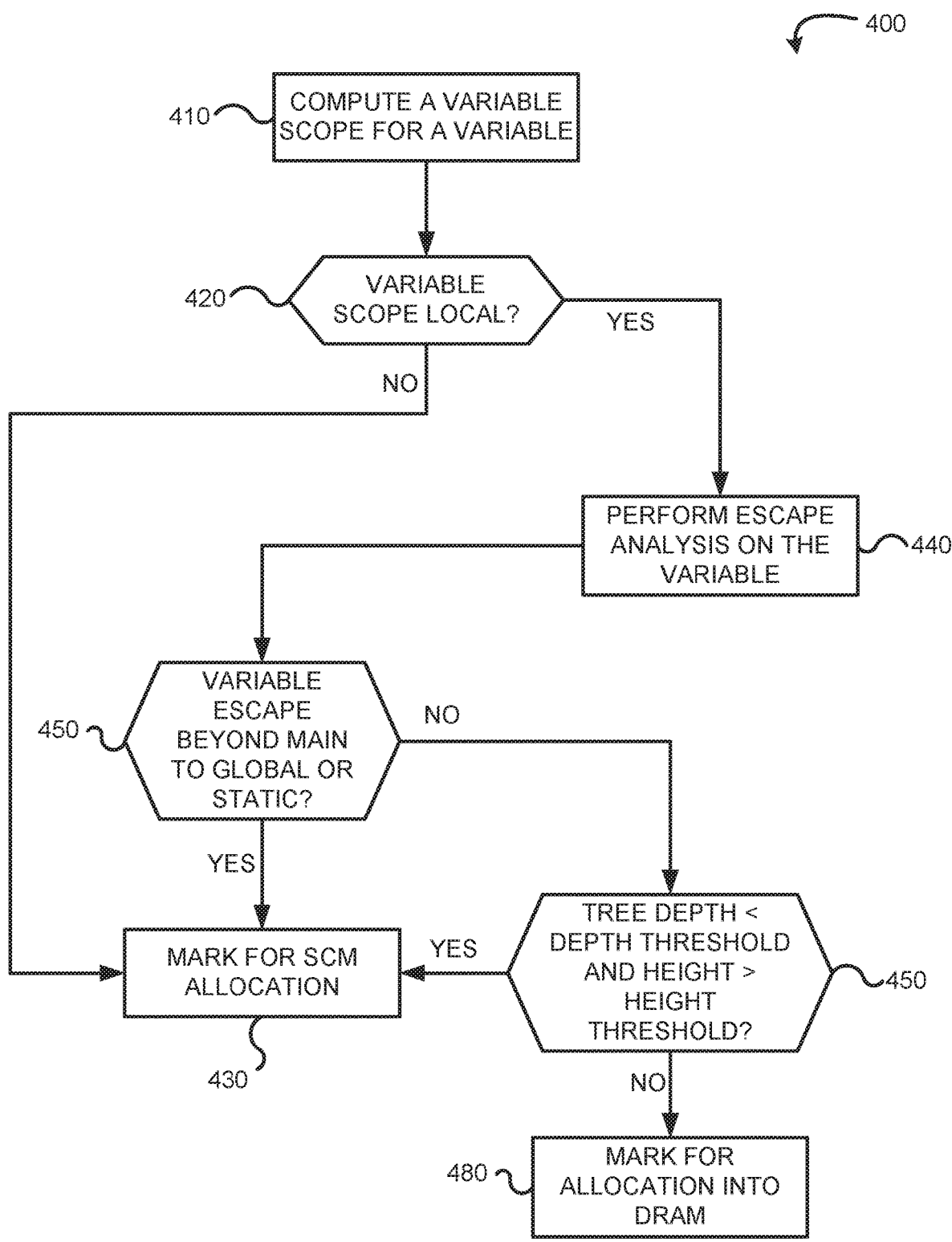
FIG. 4 is a flow chart of a data structure scope analysis process, in accordance with embodiments of the present disclosure.

FIG. 4 is a flow diagram illustrating a process 400 of computing and analyzing a variable scope (e.g., step 330 of process 300 in FIG. 3), in accordance with embodiments of the present disclosure. The process 400 may be performed by hardware, firmware, software executing on at least one processor, or any combination thereof. For example, any or all of the steps of the process 400 may be performed by one or more computing devices (e.g., computer system 1200 of FIG. 12).

The process 400 begins computing a variable scope for a variable. This is illustrated in step 410. The variable can have a variable scope of global, static, or local. Scope refers to the region of a computer program where a variable is valid. Global variables are variables that are visible and valid throughout a program. Static variables are variables that have been allocated such that their life spans the entire runtime of a program. Local variables are variables given a local scope and valid within a function or block.

A determination is made whether the variable scope of the variable is local. This is illustrated in step 420. If the variable is not a local variable (e.g., global, static), then the variable can be marked for allocation into SCM, as illustrated at step 430. However, if the variable is a local variable, then an escape analysis is performed on the variable.

Escape analysis is performed on the variable to determine whether it has dynamic scope. This is illustrated at step 440. When a variable is allocated in a procedure, a pointer to the variable can escape to other threads of execution. For example, instances such as a tail call optimization implementation, subroutines, and portions of a call stack may allow for the escape of a local variable. The escape analysis can determine the places where a pointer can be stored and whether the lifetime of the pointer can be proven to be restricted to a function/thread. During compilation, the compiler 210 can traverse the local variable to see if the variable is restricted within its originating procedure, or if the variable is called beyond the originating function.

A determination is made as to whether the variable escapes beyond the main procedure and into a global or static scope space. This is illustrated at step 450. If the variable has escaped into the global or static space, it can be considered as either a global variable or a static variable and marked for allocation into SCM. However, if the variable does not escape into the global or static space, then further analysis is required.

An evaluation is performed on the call tree of the variable. This is illustrated at step 450. The call tree can be traversed to determine a tree depth. The traversal can be performed using techniques such as depth-first search and breadth-first search. The depth of the call tree can refer to the number of nodes from the root down to the furthest leaf node. If the difference in depth of procedure under consideration is less than a predetermined depth threshold, and if the difference in depth of the procedure and the depth of the furthest leaf route is greater than a predetermined height threshold, then the variable can be marked for allocation into SCM. Otherwise, the variable is marked for allocation into DRAM. This is illustrated at step 480.

Figure 5:
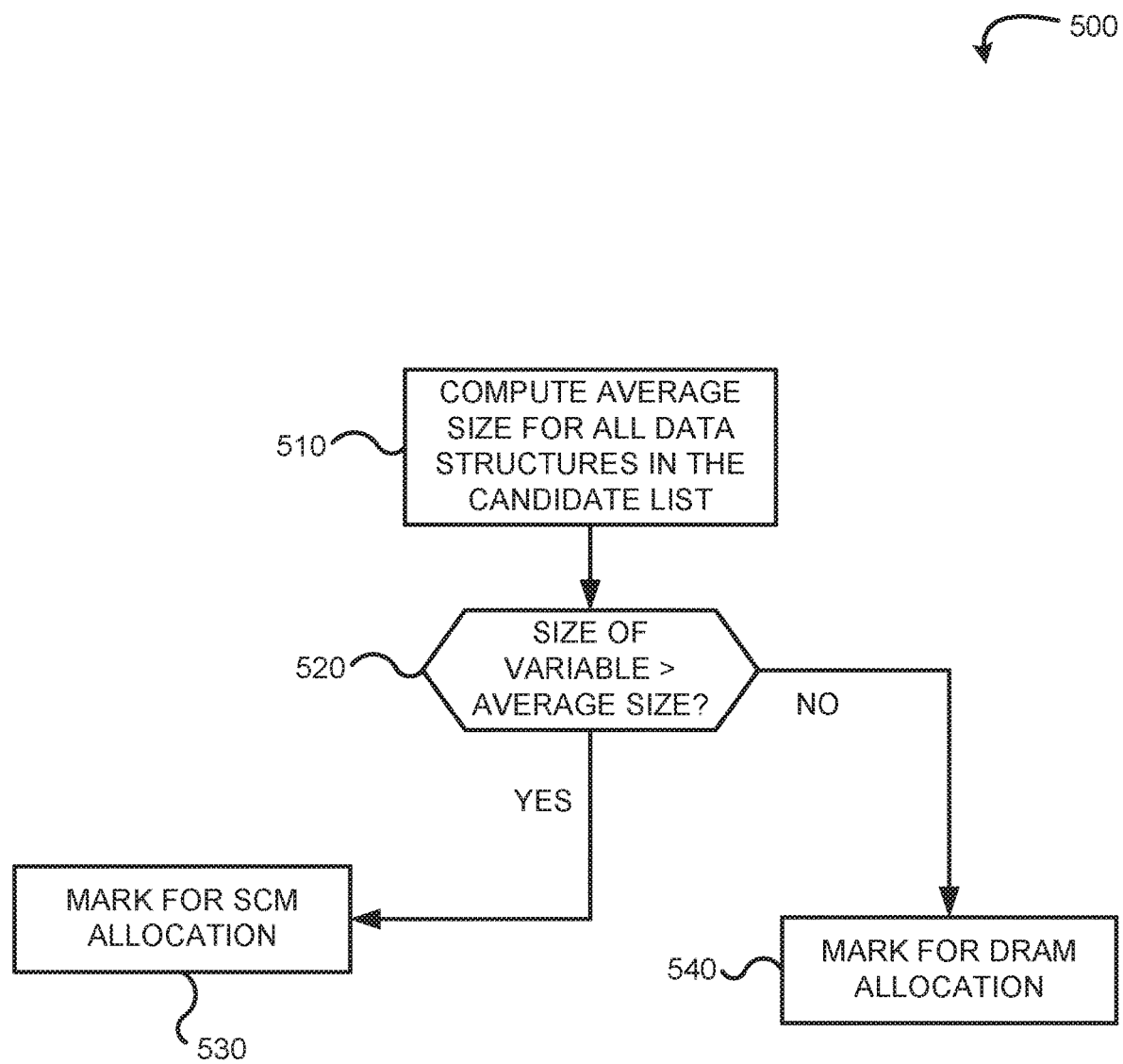
FIG. 5 is a flow chart of a memory size analysis process, in accordance with embodiments of the present disclosure.

FIG. 5 is a flow diagram illustrating a process 500 of computing a variable size (e.g., step 330 of process 300 in FIG. 3), in accordance with embodiments of the present disclosure. The process 500 may be performed by hardware, firmware, software executing on at least one processor, or any combination thereof. For example, any or all of the steps of the process 500 may be performed by one or more computing devices (e.g., computer system 1200 of FIG. 12).

The average memory size of all variables declared in the source code is computed. This is illustrated in step 510. The memory size for each variable declared in the source is computed. The average memory size is computed by taking the total memory size needed to allocate all the variables divided by the total number of variables declared. In some embodiments, the average memory size is a predetermined memory size set by an administrator. In some other embodiments, the average memory size is computed using a pre-defined function set in place by an administrator.

A determination is made as to whether the variable being analyzed has a memory size greater than the average memory size of all the variables. This is illustrated at step 520. If the memory size of the variable is greater than the average memory size of all the variables, then the variable can be marked for allocation into SCM. This is illustrated at step 530. If the memory size of the variable is less than the or equal to the average memory size of all the variables, then the variable can be marked for allocation into DRAM. This is illustrated at step 540. In some embodiments, the average memory size is a predetermined value set by an administrator. In some embodiments, the average memory size a defined function set by an administrator.

Figure 6:
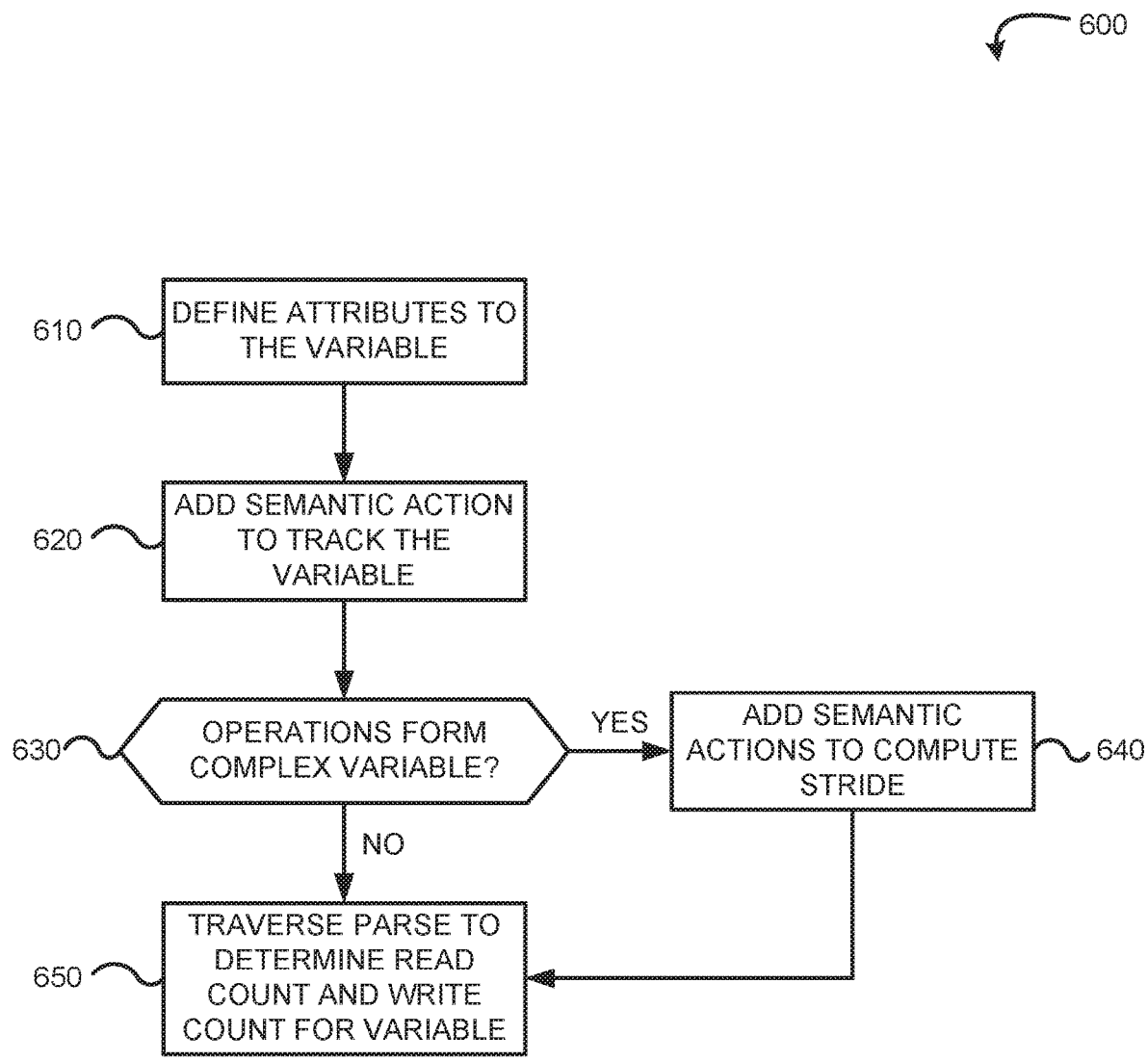
FIG. 6 is a flow chart of a static variable operation tracking process, in accordance with embodiments of the present disclosure.

FIG. 6 is a flow diagram illustrating a process 600 of computing read and write counts for a variable statically (e.g., step 340 of process 300 in FIG. 3), in accordance with embodiments of the present disclosure. The process 600 may be performed by hardware, firmware, software executing on at least one processor, or any combination thereof. For example, any or all of the steps of the process 600 may be performed by one or more computing devices (e.g., computer system 1200 of FIG. 12).

The process 600 begins by defining attributes for the variable being analyzed. This is illustrated in step 610. The additional attributes can be defined as two arrays for read operations and write operations. The first array can store write operations that occur to the variable in each procedure in which a write operation occurs. This can be referred to as the write count. The second array can store read operations that occur to the variable in each procedure in which a read operation occurs. This can be referred to as a read count. In some embodiments, only one additional attribute is defined. The additional attribute can be either the read count or the write count depending on the source code being compiled. Both arrays can be used to determine which variables are marked for allocation into SCM.

Semantic actions are added to the source code to track the variable during the compilation process of the source code. This is illustrated at step 620. The variable being tracked can indicate which procedures have accessed the variable. These procedures can be marked for further analysis. For example, if a procedure performs a write operation or a read operation on the variable, it can be marked for further analysis. For each assignment statement involving the variable, a semantic action can be inserted to track the variable.

A determination is made as to whether the read and write operations are performed on a variable that is a complex data type. This is illustrated in step 430. If the variable is complex, semantic actions can be added to the source code to compute a stride for the complex variable. This is illustrated at step 640. The stride of a complex variable, such as an array, refers to the number of locations in memory between beginnings of successive array elements, measured in bytes, or in units of the size of the array's elements.

The read count and write count of the variable is incremented for each procedure in which a read count or write count occurs. This is illustrated at step 650. If the variable is located on the left side of an assignment statement, the write count can be incremented. If the variable is located on the right side of an assignment statement, the read count can be incremented. If the variable occurs on both sides of an assignment statement, then both the read count and write count can be incremented.

In instances where a read operation and/or write operation occur within a statement that is a loop, additional compilation algorithms can be implemented to determine the counts. In some embodiments, a compilation algorithm that traverses back branches and computes dominator nodes is utilized when a loop occurs. If the loop iteration count is static, then the read count and/or the write count is incremented by the loop iteration. However, if the loop iteration count is not static, then a standard heuristic value can be used to increment the read count and/or the write count.

Figure 7:
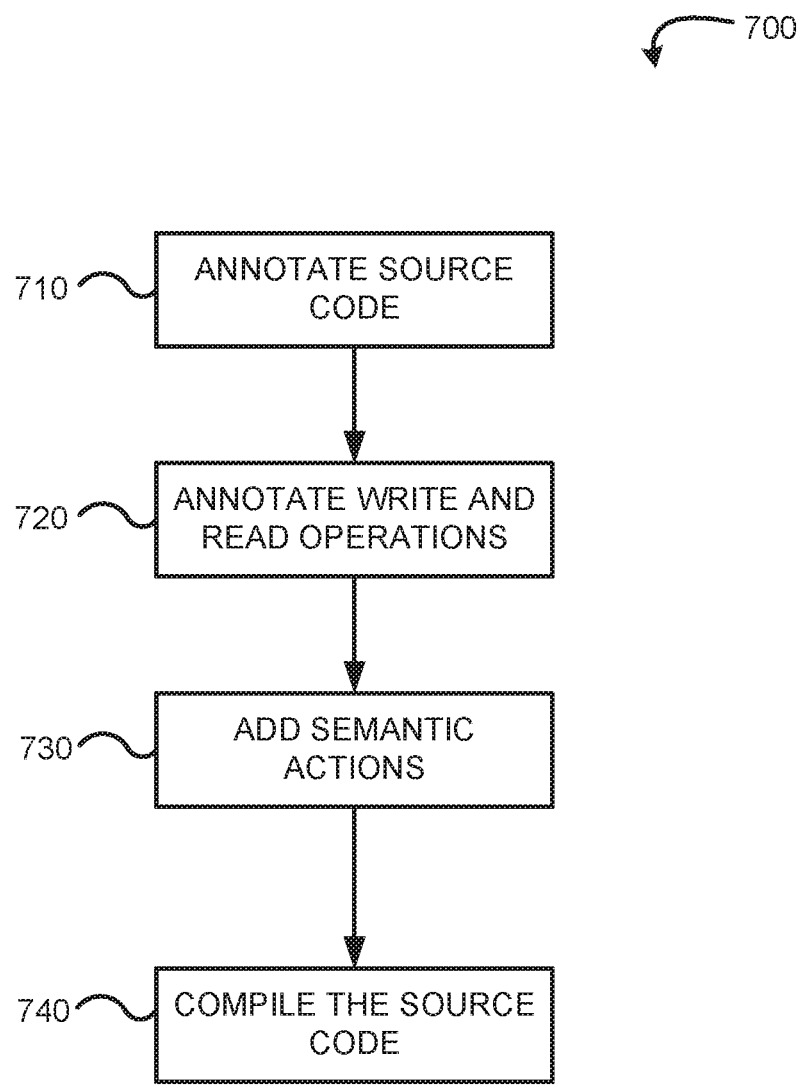
FIG. 7 is a flow chart of a dynamic variable operation tracking process, in accordance with embodiments of the present disclosure.

FIG. 7 is a flow diagram illustrating a process 700 of computing read and write counts for a variable dynamically (e.g., step 340 of process 300 in FIG. 3), in accordance with embodiments of the present disclosure. The process 700 may be performed by hardware, firmware, software executing on at least one processor, or any combination thereof. For example, any or all of the steps of the process 700 may be performed by one or more computing devices (e.g., computer system 1200 of FIG. 12).

The process 700 begins by annotating the source code with directives providing additional information to the compiler 210. This is illustrated at step 710. The directives can include instructions to create a read variable, and a write variable for each potential variable declared in the source code. Semantic actions can be inserted to also generate a read count array, and a write count array that is the size of the total number of procedures in the program as the source code is being annotated with these directives. Additional directives can also be inserted. Additional directives can be placed for each read and write operation in the source code. This is illustrated in step 720.

Semantic actions are added to the compiler to look for directives and insert instrumentation to determine a read count and write count of a dynamic variable. This is illustrated at step 730. The instrumentation that can be added to increase the read count and write count of a variable in each procedure in which a read operation occurs as indicated by the directives. If the variable is an array, a record can be made in separate variable stride arrays.

The source code is compiled to produce a source program with the instrumentation in place that includes a profile-generation option. This is illustrated at step 740. The source program can be run to determine an accurate count of each of the variables. The counts can be placed in a separate file for later retrieval. The source code can be recompiled, and use the separate file to retrieve the read count and write count of the variable to determine whether the variable qualifies for allocation into SCM or DRAM in the same manner as a static variable would be determined.

Figure 8:
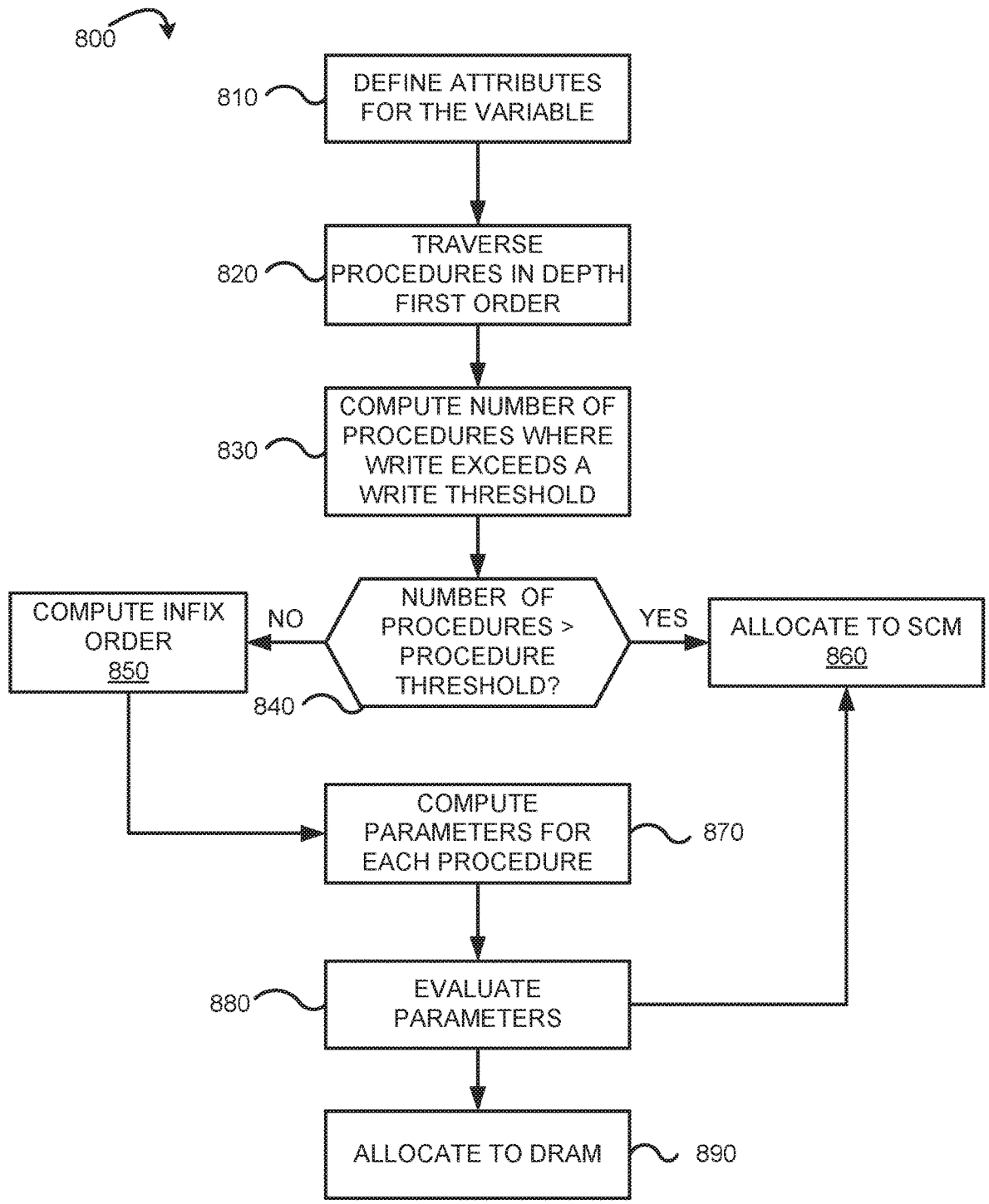
FIG. 8 is a flow chart of a write count allocation analysis process, in accordance with embodiments of the present disclosure.

FIG. 8 is a flow diagram illustrating a process 800 for allocating variables based on write counts (e.g., step 350 of process 300 in FIG. 3), in accordance with embodiments of the present disclosure. This process may be performed by hardware, firmware, software executing on at least one processor, or any combination thereof. For example, any or all of the steps of this process may be performed by one or more computing devices (e.g., computer system 1200 of FIG. 12).

The process 800 begins by defining attributes for the variable being analyzed. This is illustrated at step 810. The attributes can be defined as two arrays for write and read operations. The first array can store write operations that occur to the variable in each procedure in which a write operation occurs. This can be referred to as the write count. The second array can store read operations that occur to the variable in each procedure in which a read operation occurs. This can be referred to as a read count. In some embodiments, only one additional attribute is defined. The additional attribute can be either the read count or the write count depending on the source code being compiled.

The procedures of the program are traversed in depth-first order. This is illustrated at step 820. For each variable considered, each procedure is evaluated to determine whether the write count exceeds a predetermined write threshold. Procedures that exceed the predetermined write threshold are evaluated against a second predetermined write threshold. If the write count is greater than the second predetermined write threshold, then the write penalty may overshadow the benefit of allocating the variable into SCM. As such, those variables are designated to be allocated in DRAM. This is illustrated at step 830.

A determination is made as to whether the number of procedures with write counts exceeds a write threshold exceeds a procedure threshold. This is illustrated at step 840. If the number of procedures with write count that exceed a write threshold exceeds a procedure threshold, then the variable can be allocated into SCM. This is illustrated at step 860. However, if the number of procedures does not exceed a procedure threshold, then the process 800 proceeds to step 850, and the procedures within the source code are indexed in infix order.

An infix order of the procedures is computed. This is illustrated at step 850. An infix order involves traversing procedures in the source code and indexing them based on when they are executed. The last procedure executing will have the highest index number. Additional parameters relating to the variable are computed per procedure. This is illustrated at step 850. These parameters include, but are not limited to, a procedure index, a predetermined end threshold, a number of write operations per procedure, write pattern predictability, and whether high ILP exists between successive writes in each procedure pertaining to the variable. Based on these parameters, the variable can be allocated in either SCM or DRAM. For example, the parameter table of FIG. 9 displays an allocation preference based on which parameters were met by the variable. The parameter table of FIG. 9 can be referenced by the compiler 210 to make a determination whether to allocate the variable into SCM or DRAM.

Figure 10:
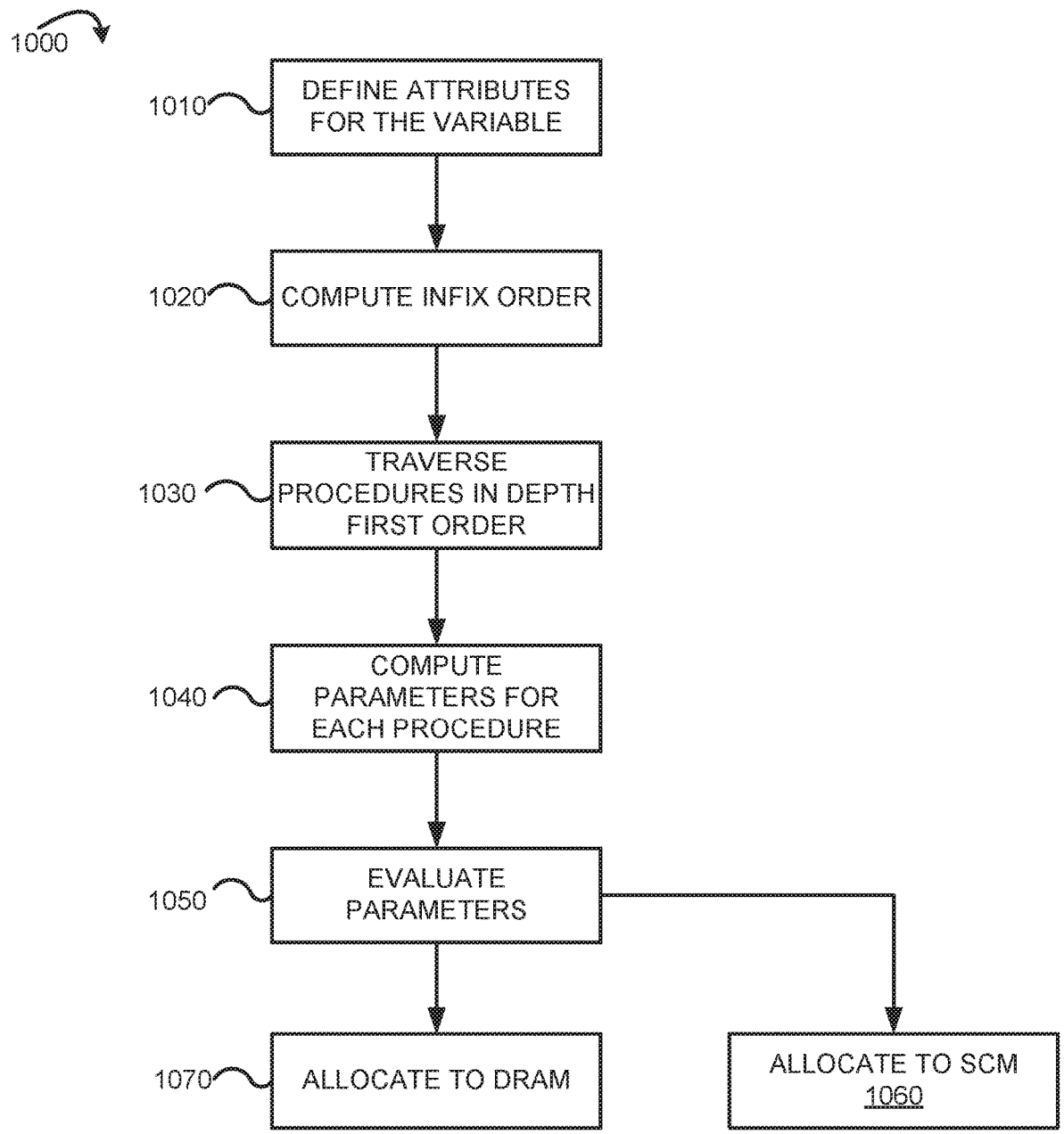
FIG. 10 is a flow chart of a read count allocation analysis process, in accordance with embodiments of the present disclosure.

FIG. 10 is a flow diagram illustrating a process 1000 for allocating variables based on read counts (e.g., step 350 of process 300 in FIG. 3), in accordance with embodiments of the present disclosure. This process may be performed by hardware, firmware, software executing on at least one processor, or any combination thereof. For example, any or all of the steps of this process may be performed by one or more computing devices (e.g., computer system 1200 of FIG. 12).

The process 1000 begins by defining attributes for the variable being analyzed. This is illustrated at step 1010. The attributes can be defined as two arrays for write and read operations. The first array can store write operations that occur to the variable in each procedure in which a write operation occurs. This can be referred to as the write count. The second array can store read operations that occur to the variable in each procedure in which a read operation occurs. This can be referred to as a read count. In some embodiments, only one additional attribute is defined. The additional attribute can be either the read count or the write count depending on the source code being compiled.

An infix order of the procedures is computed. This is illustrated at step 1020. An infix order involves traversing procedures in the source code and indexing them based on when they are executed. The last procedure executing will have the highest index number.

The procedures of the program are traversed in depth first order. This is illustrated at step 1030. Additional parameters relating to the variable are computed per procedure. This is illustrated at step 1050. These parameters include, but are not limited to, a procedure index, a predetermined end threshold, a number of read operations per procedure, read pattern predictability, and whether high ILP exists between successive reads in each procedure pertaining to the variable. Based on these parameters, the variable can be allocated in either SCM or DRAM. For example, the parameter table of FIG. 11 displays an allocation preference based on which parameters were met by the variable. The parameter table of FIG. 11 can be referenced by the compiler 210 to make a determination whether to allocate the variable into SCM or DRAM.

In some embodiments, populating certain variables through the use of special operating system APIs can also make variables amenable to SCM allocation. Additionally, users can specify using certain directives that they want particular variables placed in SCM are also supported within this disclosure. Also, other characteristics, such as pattern matching with certain special code (e.g., boot code) can be beneficial to store in SCM.

Figure 12:
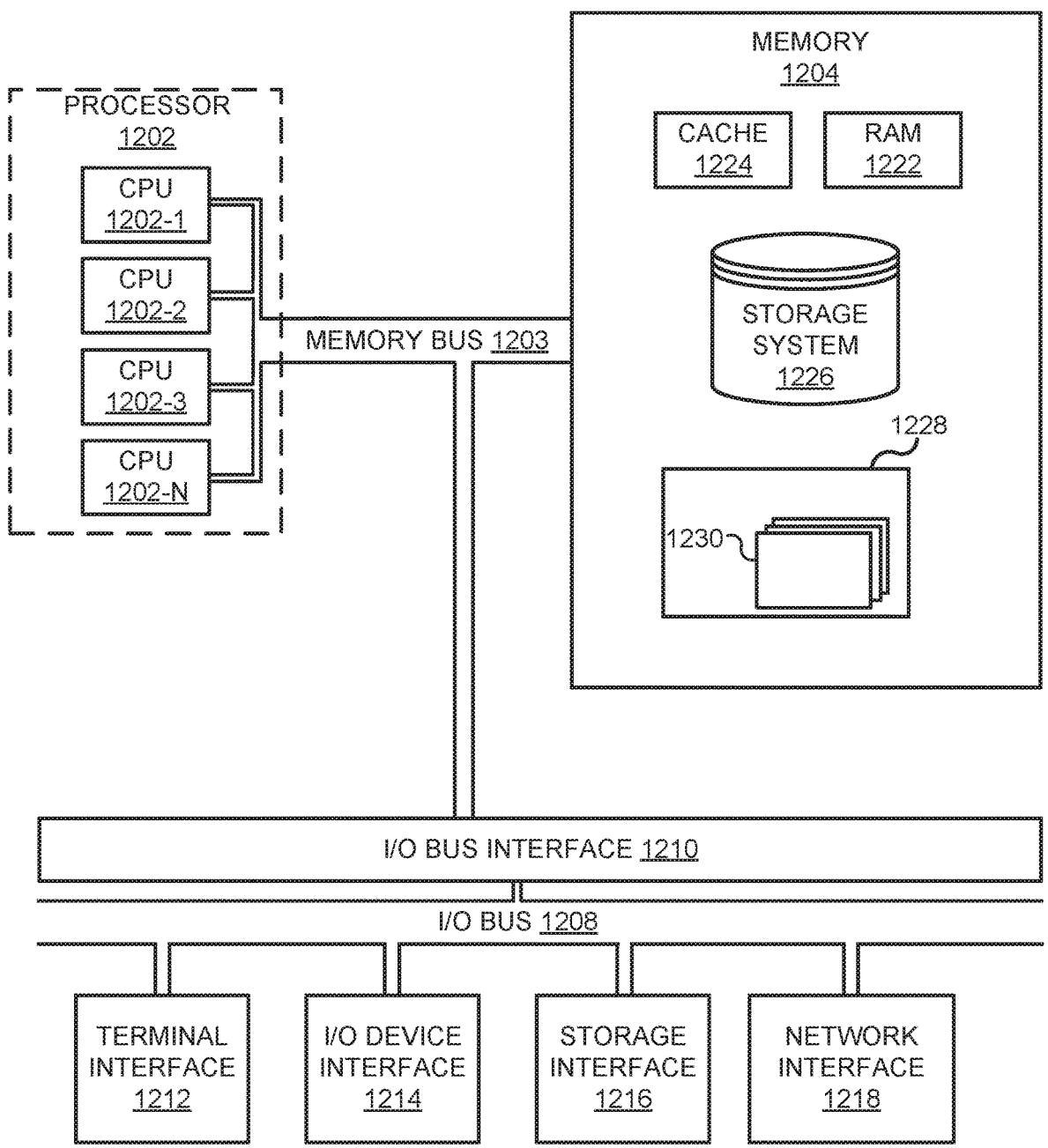
FIG. 12 is a high-level block diagram illustrating an example computer system that may be used in implementing one or more of the methods, tools, and modules, and any related functions described herein, in accordance with embodiments of the present disclosure.

Referring now to FIG. 12, shown is a high-level block diagram of an example computer system 1200 (e.g., variable allocation system 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1200 may comprise one or more processors 1202, a memory 1204, a terminal interface 1212, a I/O (Input/Output) device interface 1214, a storage interface 1216, and a network interface 1218, all of which may be communicatively coupled, directly or indirectly, for inter-component communication via a memory bus 1203, a I/O bus 1208, and an I/O bus interface 1210.

The computer system 1200 may contain one or more general-purpose programmable central processing units (CPUs) 1202-1, 1202-2, 1202-3, and 1202-N, herein generically referred to as the processor 1202. In some embodiments, the computer system 1200 may contain multiple processors typical of a relatively large system; however, in other embodiments, the computer system 1200 may alternatively be a single CPU system. Each processor 1201 may execute instructions stored in the memory 1204 and may include one or more levels of on-board cache.

The memory 1204 may include computer system readable media in the form of volatile memory, such as random-access memory (RAM) 1222 or cache memory 1224. Computer system 1200 may further include other removable/non-removable, volatile/non-volatile computer system storage media. By way of example only, storage system 1226 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 1204 can include flash memory, e.g., a flash memory stick drive or a flash drive. Memory devices can be connected to memory bus 1203 by one or more data media interfaces. The memory 1204 may include at least one program product having a set (e.g., at least one) of program modules that are configured to carry out the functions of various embodiments.

Although the memory bus 1203 is shown in FIG. 12 as a single bus structure providing a direct communication path among the processors 1202, the memory 1204, and the I/O bus interface 1210, the memory bus 1203 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1210 and the I/O bus 1208 are shown as single respective units, the computer system 1200 may, in some embodiments, contain multiple I/O bus interface units, multiple I/O buses, or both. Further, while multiple I/O interface units are shown, which separate the I/O bus 1208 from various communications paths running to the various I/O devices, in other embodiments some or all of the I/O devices may be connected directly to one or more system I/O buses.

In some embodiments, the computer system 1200 may be a multi-user mainframe computer system, a single-user system, or a server computer or similar device that has little or no direct user interface but receives requests from other computer systems (clients). Further, in some embodiments, the computer system 1200 may be implemented as a desktop computer, portable computer, laptop or notebook computer, tablet computer, pocket computer, telephone, smart phone, network switches or routers, or any other appropriate type of electronic device.

It is noted that FIG. 12 is intended to depict the representative major components of an exemplary computer system 1200. In some embodiments, however, individual components may have greater or lesser complexity than as represented in FIG. 12, components other than or in addition to those shown in FIG. 12 may be present, and the number, type, and configuration of such components may vary.

One or more programs/utilities 1228, each having at least one set of program modules 1230 may be stored in memory 1204. The programs/utilities 1228 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1228 and/or program modules 1230 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for allocating a variable into storage class memory during compilation of a program, the method comprising:
   selecting a variable recorded in a symbol table during compilation;
   computing a scope of the variable by analyzing attributes related to the variable;
   computing a variable memory size of the variable by analyzing the attributes related to the variable;
   computing additional attributes relating to the variable;
   analyzing the scope, the variable memory size, and the additional attributes by determining the scope of the variable is a local scope;
   performing an escape analysis on the variable;
   determining, based on the escape analysis, the variable escape beyond a procedure that declared the variable;
   marking the variable for allocation into storage class memory upon determining the variable escape beyond a main procedure in the program; and
   allocating the variable into a storage class memory based on the analysis performed.

2. The computer implemented method of claim 1, wherein analyzing comprises:
   calculating an average size of variables recorded in the symbol table during compilation;
   comparing the average size of the variables to the variable memory size of the variable; and
   marking the variable for allocation into the storage class memory determining the variable memory size is greater than the average size of the variable.

3. The computer implemented method of claim 1, wherein analyzing comprises:
   defining additional attributes to the variable;
   traversing procedures in the program to compute an infix order of the procedures;
   computing additional parameters relating to the variable for each parameter;
   evaluating the additional parameters to determine which of the additional parameters are applicable to the variable; and
   marking the variable for allocation into storage class memory based on evaluating the parameters.

4. The computer implemented method of claim 3, wherein the parameters include a procedure index exceeding an end threshold, write pattern predictability analysis, the write count exceeding a write threshold, and an instruction level parallelism measure.

5. The computer implemented method of claim 3, wherein the parameters include a procedure index exceeding an end threshold, a read pattern predictability analysis, the read count exceeding a read threshold, and an instruction level parallelism measure.

6. The computer implemented method of claim 1, wherein the additional attributes include a write count indicating a number of write operations made to the variable for each procedure in which a write operation occurs on the variable, and a number of procedures where the write count exceeds a write threshold.

7. The computer implemented method of claim 6, wherein analyzing comprises:
   computing additional attributes relating to the variable, wherein the additional attributes include a write pattern predictability measure;
   computing an instruction level parallelism measurement between write operations in each of the procedures;
   computing an index of the procedures in the program based on an infix order;
   applying a function to the additional attributes, the instruction level parallelism measurement, and the infix order; and
   marking the variable for allocation into the storage class memory based on the function.

8. The computer implemented method of claim 1, wherein the additional attributes include a read count indicating a number of read operations made to the variable for each procedure in which a read operation occurs on the variable.

9. The computer implemented method of claim 1, wherein the additional attributes include a pattern match using a pre-fed code pattern.

10. The computer implemented method of claim 1, wherein the additional attributes include an instruction level parallelism measurement.

11. A variable allocation system comprising:
    at least one processor;
    at least one memory component;
    a compiler configured to compile source code of a high-level programming language into a low-level language understandable and executable by a computer;
    a variable scope analyzer configured to determine a scope relating to variable declared in the source code;
    a variable size analyzer configured to determine variable memory sizes of the variables;
    a variable operation counter configured to determine a read count indicating a number of read operations and a write count indicating a number of write operations performed on the variables;
    an instruction level parallelism analyzer configured to determine a measurement of how many instructions in the high-level programming language are executable simultaneously; and
    a variable allocator configured to analyze the variable memory sizes of the variables, the number of read operations, the number of write operations, and the measurement to determine allocation locations for the variables.

12. The variable allocation system of claim 11, wherein the variable allocator is further configured to allocate the variables based on the scope of the variables, wherein global variables and static variables are allocated into a storage class memory.

13. The variable allocation system of claim 11, wherein the variable allocator is further configured to perform an escape analysis on the variables with a local scope, wherein the variables escaping beyond a main procedure are allocated into a storage class memory.

14. The variable allocation system of claim 11, wherein the variable size analyzer is further configured to determine an average size of the variables.

15. A computer program product comprising a computer readable medium having program instructions embodied therewith, the program instructions being executable by a processor to cause the processor to perform a method comprising:
    selecting a variable recorded in a symbol table during compilation;
    computing a scope of the variable by analyzing attributes related to the variable;
    computing a variable memory size of the variable by analyzing the attributes related to the variable;
    computing additional attributes relating to the variable;
    analyzing the scope, the variable memory size, and the additional attributes by determining the scope of the variable is a local scope;
    performing an escape analysis on the variable;
    determining, based on the escape analysis, the variable escape beyond a procedure that declared the variable;
    marking the variable for allocation into storage class memory upon determining the variable escape beyond a main procedure in the program; and
    allocating the variable into a storage class memory based on the analysis performed.

16. The computer program product of claim 15, wherein analyzing comprises:
    calculating an average size of variables recorded in the symbol table during compilation;
    comparing the average size of the variables to the variable memory size of the variable; and
    marking the variable for allocation into the storage class memory determining the variable memory size is greater than the average size of the variable.

17. The computer program product of claim 15, wherein analyzing comprises:
    defining additional attributes to the variable;
    traversing procedures in the program to compute an infix order of the procedures;
    computing parameters relating to the variable for each parameter;
    evaluating the parameters to determine which of the parameters are applicable to the variable; and
    marking the variable for allocation into storage class memory based on evaluating the parameters.

18. The computer program product of claim 17, wherein the parameters include a procedure index exceeding an end threshold, a write pattern predictability analysis, the write count exceeding a write threshold, and an instruction level parallelism measure.

\* \* \* \* \*